May 25, 1937.   A. P. FERGUESON   2,081,582
TIRE COVER AND HUB CAP SUPPORT
Filed May 26, 1934   2 Sheets-Sheet 1
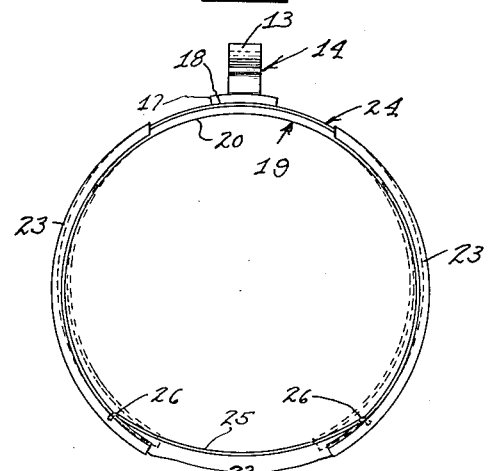
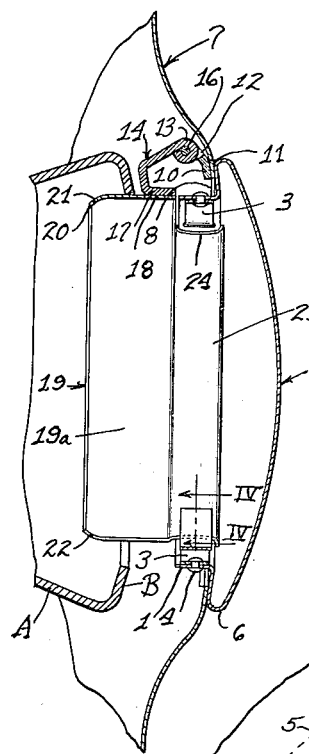
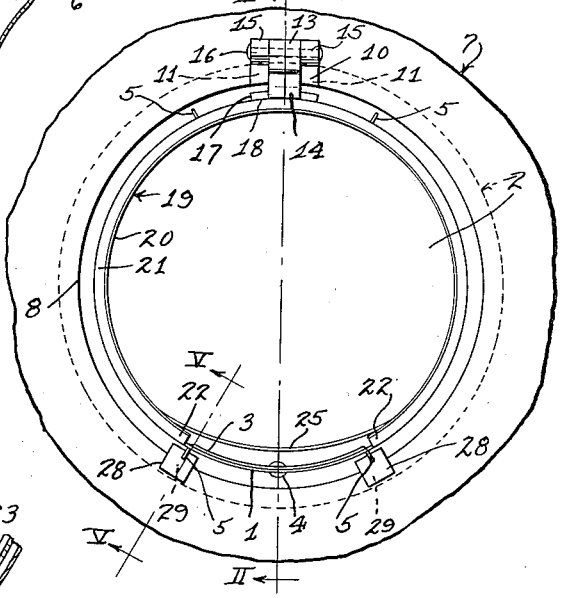
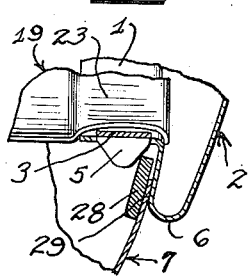
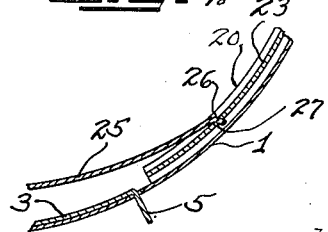
Inventor
Arthur P. Fergueson.

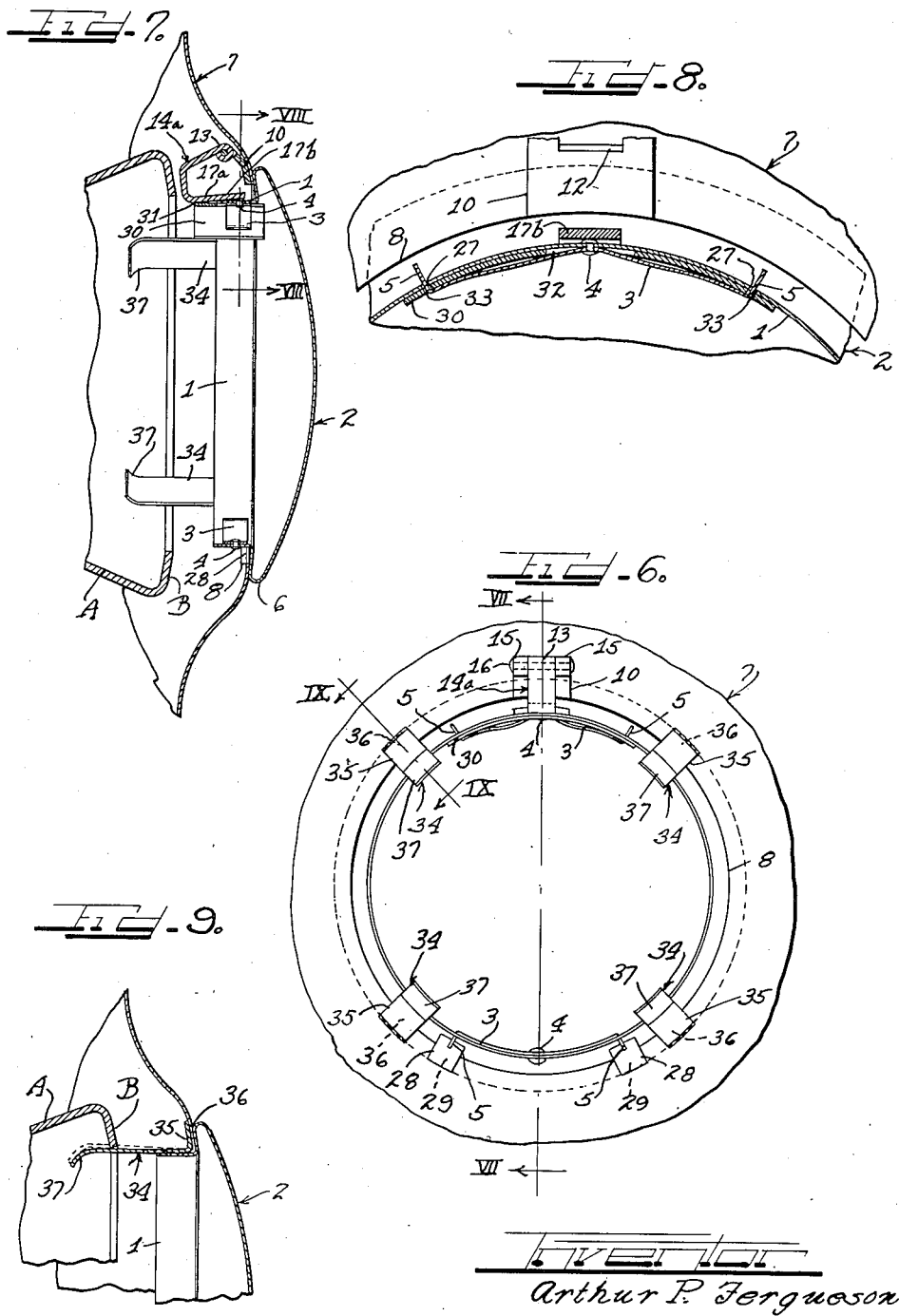

Patented May 25, 1937

2,081,582

UNITED STATES PATENT OFFICE 2,081,582

TIRE COVER AND HUB CAP SUPPORT

Arthur P. Fergueson, Detroit, Mich., assignor to Lyon Cover Company, Detroit, Mich., a corporation of Michigan Application May 26, 1934, Serial No. 727,626

19 Claims. (Cl. 150—54)

This invention has to do with tire covers and is concerned more particularly with a support for a tire cover and hub cap.

It is an object of the invention to provide means for supporting a tire cover from the hub of a spare wheel and at the same time supporting a hub cap from the cover.

It is another object of the invention to provide an adapting means for releasably hinging a hub cap to a spare tire and wheel cover.

It is another object of the invention to provide means for centering a cover relative to a spare tire and wheel and also to center a hub cap relative to the cover, wheel and tire.

It is a further object of the invention to provide a tire cover with centering means hingedly supported from the cover and arranged to cooperate with the hub of the wheel.

It is still another object of the invention to provide an expansible and contractible tire cover supporting means formed to releasably support a cap so that the same may swing relative to the cover.

Another object of the invention consists in the provision of centering means connected to a tire cover, together with a cap for the center of the cover, the cap and centering means being constructed and arranged to be telescoped and releasably secured together.

A further object of the invention resides in the provision of means for releasably hinging a hub cap to a spare tire cover, and providing a snap fastening means for releasably holding the cap in stationary relation to the cover.

It is another object of the invention to provide a hub cap with centering means and releasably pivotally connect the cap to the cover in substantially coaxial relation therewith, so that the centering means will cooperate with the spare wheel hub to support the cover in centered relation to the spare wheel and tire.

In accordance with the general features of the invention relating to one form thereof, a split ring is hinged in approximately coaxial relation to and within the central portion of a spare wheel and tire cover and formed when expanded to engage within the spare wheel hub to center the cover thereon. The ring has a forward extension providing a peripheral recess in which the skirt of a hub cap adapted to cooperate with the hub may be received releasably. Means is provided for the flexing of the ring to releasably interlock the same with the skirt, at the same time enabling the ring to assume a diameter for proper cooperation with the hub. The cover has a central opening formed with means to provide a snap fastener engagement with one or more of the usual spring retainers on the skirt, for holding the cap in stationary relation to the cover. The cap when thus in place conceals the opening in the cover, and may be readily snapped open and swung outwardly to permit access to the bolt and nut means attaching the hub of the wheel to a carrier mounted on the automobile (not shown).

In accordance with another form of the invention, the cover is provided interiorly thereof and adjacent its substantially central opening with a hinge carrying a plate arranged to be interlocked with the skirt of the hub cap through one or more of the spring retainers attached to the skirt, whereby the cap may be hingedly and releasably connected to the cover. The cover is provided with centering means preferably independent of the hinge so that said centering means may resiliently engage the hub and support the cover therefrom. One or more of the skirt springs spaced from the hinge cooperates with a correspondingly spaced portion of the cover to have a releasable snap fastener engagement therewith to releasably hold the cap in closed position.

The cap is preferably of a conventional construction which is equally adapted for employment in cooperation with the hub itself and with the tire cover itself.

The construction is accordingly extremely simple, involving few parts which are readily manipulated for the purposes desired, may be manufactured at low cost since the parts require essentially only stamping operations, the cap and cover being readily separable from each other when it is desired to employ the cap in conjunction with a hub.

Other advantages of the invention will appear as the description proceeds.

This invention (in preferred forms) is illustrated in the drawings and hereinafter more fully described.

On the drawings:

Figure 1 is a fragmentary rear elevational view of a construction embodying one form of the invention.

Figure 2 is a fragmentary sectional view taken substantially in the plane designated by the line II—II in Figure 1, certain parts being shown for convenience in elevation.

Figure 3 is a front elevational view of the centering and hub cap supporting means.

Figure 4 is an enlarged fragmentary view taken substantially in the plane IV—IV of Figure 2.

Figure 5 is an enlarged fragmentary sectional view taken substantially in the plane V—V of Figure 1.

Figure 6 is a fragmentary rear elevational view of another form of the invention.

Figure 7 is a fragmentary sectional view taken substantially in the plane designated by the line VII—VII in Figure 6.

Figure 8 is an enlarged fragmentary sectional view taken substantially in the plane designated by the line VIII—VIII in Figure 7.

Figure 9 is a fragmentary sectional view of a part of the centering means and associated structure, taken substantially in the plane designated by the line IX—IX in Figure 6.

Referring now more particularly to the drawings, one form of the invention is shown in Figures 1, 2 and 3, wherein the hub A of a spare wheel has its front wall B provided with an opening which is coaxial with the wheel and is adapted to telescopically receive the skirt 1 of the hub cap 2 and to be interlocked therewith by any suitable means as the leaf springs 3 riveted at 4 or otherwise suitably and preferably rigidly secured intermediate its ends to the skirt. The ends of each spring 3 are bent outwardly at 5 so as to pass through corresponding openings in the skirt 1 and project generally radially outwardly therefrom. The skirt 1 is of such circumference as to be substantially engageable within the hub opening and the ends 5 of each spring 3 are arranged to project radially beyond the opening in the hub so as to engage the inner side of the wall B and thus sandwich said wall between said ends 5 and the flange 6 of the cap 2. Thus the cap 2 is releasably interlocked with the hub A. The ends 5 of each spring 3 are beveled to a rounded or substantially V-shape so as to readily cam inward upon engagement of an obstruction such as the inner periphery of the wall B of the hub A.

To the end that the tire cover may also releasably accommodate the cap 2 so that when the cover is applied to a spare wheel and tire, the cap normally cooperating with the hub of the wheel may cooperate with the cover, the cover includes a side plate 7 formed to extend substantially from the hub of the wheel to the outer periphery of the tire and preferably to cover the front of the spare wheel and tire and has a substantially central opening 8 of a diameter greater than the diameter of the front opening in the wheel hub. Any suitable means such as a split resilient ring member (not shown) may fit around the tread of the tire and overlap the outer peripheral portion of the front cover member 7 to hold the same in place, or, if desired, the front cover member may extend rearwardly over the tire tread and be secured in any other suitable way.

A hinge wing 10 is preferably spot welded or otherwise suitably secured at 11 interiorly of the cover member 7 and adjacent the opening 8. The wing 10 has spaced portions 12 between which the eye 13 of a relatively movable wing 14 is located, the eyes 15 of the wing 10 straddling the eye 13. A hinge pin 16 passes through the several eyes and is preferably tightly held within the eyes 15 and snugly within the eye 13 so that the wing 14 may swing about the pin 16 and yet will frictionally hold itself in any position to which the same may be adjusted about the pin 16.

The wing 14 is bent rearwardly and then forwardly to provide an anchor portion 17 which is welded at 18 or otherwise suitably secured at 18 to the outer periphery of a split ring 19 whose rear edge portion 20 is turned inwardly to provide a cam surface 21 arranged to engage the inner periphery of the wall B of the hub A to facilitate positioning of the ring 19 therein as will hereinafter appear. The ring 19 is substantially cylindrical, but is split to enable the same to be expansible and contractible, providing spaced ends 22. The ring 19 is provided forwardly with spaced peripheral connector portions 23 which are generally cylindrical but are transversely arcuate with their concave surfaces outermost, providing arcuate outer recesses of such width as to receive the skirt 1 of the cap 2 and of such depth that when the skirt is fitted in said recesses, the main cylindrical portion 19a of the ring 19 constitutes substantially a continuation of the skirt 1. The distance between the ends 22 is preferably slightly greater than the distance between the end portions 5 of the spring 3 so as to provide clearance for such movement of the portions 5 as may be necessary in the interlocking and releasing thereof with respect to the hub and, as will appear hereinafter, with respect to the cover 7. The portions 23 are spaced apart opposite the ends 22 to provide a clearance at 24 for the opposite spring 3. In the illustrated form of the invention, the cap 2 is provided with a pair of oppositely disposed springs 3. However, it will be appreciated that the invention is susceptible of use with a hub cap in which the springs are differently arranged than those illustrated, or a different number of springs may be employed, the portion 23 being correspondingly formed to provide adequate clearance.

The ring 19 is normally of substantially less diameter than the opening in the hub A and than the hub cap skirt 1, in order that the transversely arcuate portion 23 may be readily telescoped into the skirt 1 so that the skirt may be disposed within the outer peripheral recess afforded by the portions 23. When this relationship is established, a leaf spring 25 having its ends angularly offset as at 26 is positioned within the portions 23 so as to bridge the gap between the ends 22. The ring 19 is forcibly expanded by hand, this being preferably accomplished by placing a finger against one of the portions 23 and a thumb against the other portion 23 near the ends 22 and thrusting the same apart until they are substantially engaged with the skirt 1. Thereupon one of the ends 26 is inserted in an opening 27 adjacent each end 22, the spring 25 being bowed to make this possible, since the spring 25 is normally longer than the distance between the openings 27 when the ring 19 is expanded as just described. Instead of expanding the ring 19 by hand, the same may be done by simply bowing the spring 25 to such an extent that the ends 26 thereof may be fitted in the openings 27 when the ring 19 is in its normally contracted condition, and then allowing the spring 25 to expand. The expansion of the spring 25 will thrust the end portions 22 of the ring 19 apart, and expand the ring into interlocked telescoped relation to the skirt 1 of the cap 2. It will be appreciated that in order to facilitate the manipulation of the ring 19, so that the same may be interlocked with the cap 2, the ring 19 is preferably swung to the right and upward, viewing Figure 2, and then telescoped with the skirt 1. The spring 25 can then be inserted through the rear open side of the ring 19, which under such conditions would be positioned lowermost, and then interlocked with the ring 19, causing the same to be expanded into interlocked relation to the skirt 1. The cap 2 is thereby interlocked with the ring 19 and will move therewith.

The opening 8 in the cover member 7 as heretofore stated is preferably larger in diameter than the opening in the hub A, so that the skirt 1 of the cap 2 may be readily positioned in the opening 8, the outer extremities of the offset end portions 5 of the springs 3 clearing the rim of said opening 8 as shown in Figure 1. Opposite the hinge wing 10 and in spaced relation to each other are two retainer pieces 28 spot-welded at 29 or otherwise suitably secured to the interior of the cover member 7. The pieces 28 project generally radially inwardly so as to lie in the path of movement of the end portions 5 of the lower spring 3, and when the cap 2 is swung to bring its flange 6 against the cover member 7, the end portions 5 engage the retaining pieces 28 and are cammed inward thereby to such an extent as to clear the inner ends of the elements 28. As the swinging of the cap 2 is continued, the end portions 5 slip rearwardly over and snap outwardly relative to the elements 28 so as to engage the same and yieldably hold the flange 6 against the cover member 7. To withdraw the cap 2, it is necessary merely to grasp the lower part of the flange 6 or insert a tool between the same and the adjacent portion of the cover member 7 so as to pry the cap 2 outwardly and cause the end portions 5 of the spring 3 opposite the hinge to be released from the retaining elements 28. When expanded as just described, the ring 19 is shaped so as to slide telescopically through the opening in the hub A and thus serve to center the cover member 7 and associated cap 2 relative to the wheel. The fit of the ring 19 in the hub A is preferably such as not to cause any contraction of the ring 19, so that the portions 23 of the ring may be properly interlocked with the cap skirt 1.

Access to the wheel securing nuts or bolts may be obtained by merely swinging the cap 2 and the associated ring 19 open. Thus the cover need not be removed independently of the wheel and tire.

In the form of the invention appearing in Figures 6 to 9, the movable hinge wing 14a has a forwardly extending inner portion 17a provided with an outwardly offset portion 17b providing a recess in which the rivet 4 and associated skirt portion adjacent one of the springs 3 may be received. An arcuate strap preferably of such curvature as to fit within the skirt 1 is shown at 30 and is secured substantially centrally thereof to the portion 17a of the wing 14a as at 31 by welding, riveting or the like. The strap 30 is cut out at 32 forwardly of the portion attached to the wing 14a, to such an extent as to provide clearance for the riveted central portion of one of the springs 3 as will appear hereinafter.

The strap 30 is of greater length than the distance between the openings 27 in the skirt 1 and is provided with openings 33 adapted to register with the respective openings 27.

The cap 2 is attached to the wing 14a by grasping the end portions of one of the springs 3 and drawing the same inwardly until the extremities of the end portions 5 are spaced from the inner periphery of the skirt 1 a distance slightly in excess of the thickness of the strap 30. The strap 30 is then inserted between the spring 3 and the adjacent portion of the skirt 1, the strap 30 clearing the central riveted portion of the spring 3 by virtue of its cut out 32, and when the openings 33 in the strap 30 are brought into register with the openings 27 in the adjacent portion of the skirt 1, the ends of the spring 30 are released to pass through the respective registering openings to establish the relationship shown more clearly in Figure 8. The end portions 5 of the spring 3 thus serve to releasably interlock the strap 30 and consequently the hinge wing 14a with the skirt 1 of the cap 2, the adjacent portion of the skirt fitting in the recess afforded by the offset portion 17b of the wing 14a. This interlocking may perhaps best be accomplished by first having the hinge wing 14a swung outwardly beyond the position shown in Figure 7, so that all parts of the cap 2 may be free and thus the parts may be readily assembled. After the cap 2 is thus attached to the hinge wing 14a, the cap 2 may be swung rearwardly to cause the end portions 5 of the other spring 3 to snap over the elements 28 attached to the portion of the cover member 7 opposite the hinge, thus releasably interlocking the cover with the cap 2 so that the latter conceals the opening 8 in the cover.

To the end that the cover 7 and associated cap 2 may be properly centered with respect to the spare wheel, a plurality of straps 34 is arranged in a circumferential series so as to project normally slightly outward of the rim of the opening in the front wall B of the hub A. The straps 34 have outwardly projecting portions 35 forwardly thereof welded at 36 or otherwise suitably secured interiorly of the cover member 7 adjacent the opening 8 therein. The arms or straps 34 at their rear ends are curved inwardly at 37 to provide cam surfaces, said arms 37 being resilient and cammed inward by the rim of the opening in the hub A as the cover member 7 is shoved rearwardly toward the spare wheel. Thus when the cover member 7 is positioned in proper relation to the spare wheel and tire, as shown in Figures 7 and 9, the arms 34 resiliently engage the rim of said opening in the hub A and thus yieldably support and center the cover member 7 relative to the spare wheel and tire.

By grasping the portion of the flange 6 of the cap 2 opposite the hinge therefore, and pulling outwardly, or by inserting a tool between the said flange and the cover member 7 so as to pry the cap 2 loose from the cover member 7, the cap 2 may be swung to permit access to the nuts or bolts by which the hub A is secured to the spare wheel carrier. The fit of the wing 14a with respect to the other hinge elements is snug so that, preferably, the cap 2 will remain in any desired position of adjustment so as not to interfere with such operations as may be necessary to release the spare wheel from the carrier. Thereupon the cover and the spare wheel and tire may be removed as a unit. When it is desired to connect the cap 2 to the hub A, the cap 2 may be readily released from the wing 14a by grasping the end portions of the associated spring 3 so as to remove the ends 5 from the openings 33 in the strap 30. Thereupon the cap 2 is pulled outwardly free of said strap 30 and wing 14a. Then the skirt 1 of the cap 2 may be inserted in the opening in the hub A, the ends of the springs snapping over the rim of said opening and into interlocked relation to the front wall B of the hub.

The number of spring arms 34 may be varied as desired, four being employed in the embodiment herein disclosed for illustrative purposes only.

Other details of the cover member 7 may be varied as desired, examples of the variations having been set out hereinbefore.

The cover member 7, cap 2 and associated parts may be made of any suitable sheet material such as sheet metal, hard rubber, rubber composition, fibre, phenolic condensation product or the like, and the construction is very neat in appearance and may be readily assembled and disassembled.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with a plate-like member having an opening and formed to cover the front side of a spare wheel with its opening in front of the wheel hub, a hub cap for the hub and said opening in the member and having means whereby the cap may be detachably secured to the wheel hub, and means affording a detachable and adjustable connection between the cap and the member, whereby the cap may be connected interchangeably with the hub and the member and may be adjusted relative to the member while connected thereto, to render the interior of the hub accessible through said opening.

2. In combination with a plate-like spare wheel cover member having an opening arranged to be disposed in front of a spare wheel hub so as to render the interior of the hub accessible through said opening, a cap formed to be selectively interlocked with the hub or to cover said opening, respectively, and means associated with said member and constructed and arranged to adjustably support the cap from the member, whereby the cap may be moved to closed and open positions relative to the member.

3. In combination with a platelike member having an opening and formed to cover the front side of a spare wheel with its opening in front of the wheel hub, a hub cap for the hub and said opening in the member and having means whereby the cap may be detachably secured to the wheel hub, and means affording a detachable and adjustable connection between the cap and the member, whereby the cap may be connected interchangeably with the hub and the member and may be adjusted relative to the member while connected thereto, to render the interior of the hub accessible through said opening, and means arranged to cooperate with said member and the first means to hold the cap in closed relation to the member.

4. In combination with a platelike spare wheel cover member having an opening arranged to be disposed in front of a spare wheel hub so as to render the interior of the hub accessible through said opening, a cap formed to be detachably interlocked with the hub and to cover said opening, and means associated with said member and constructed and arranged to adjustably support the cap from the member, whereby the cap may be moved to closed and open positions relative to the member, and means associated with said member and the cap and arranged to hold the cap in closed relation to the member.

5. In combination with a platelike member having an opening and formed to cover the front side of a spare wheel with its opening in front of the wheel hub, a hub cap for the hub and said opening in the member and having means whereby the cap may be detachably secured to the wheel hub, and means affording a detachable and adjustable connection between the cap and the member, whereby the cap may be connected interchangeably with the hub and the member and may be adjusted relative to the member while connected thereto, to render the interior of the hub accessible through said opening, said connection including frictionally engaging parts for frictionally holding the cap in the desired position of adjustment.

6. In combination with a platelike spare wheel cover member having an opening arranged to be disposed in front of a spare wheel hub so as to render the interior of the hub accessible through said opening, a cap formed to be detachably interlocked with the hub and to cover said opening, and means associated with said member and constructed and arranged to adjustably support the cap from the member, whereby the cap may be moved to closed and open positions relative to the member, said means including frictionally engaging parts for frictionally holding the cap in the desired position of adjustment.

7. In combination with a platelike spare wheel cover member having an opening arranged to be disposed in front of the spare wheel hub so as to render the interior of the hub accessible through said opening, a radially flexible ring carried interiorly by the member, a cap for said opening and formed to telescope with the ring so that when the ring is flexed in one direction, the cap and ring are interlocked, said ring being so arranged that when the cap is interlocked therewith, the cap conceals said opening.

8. In combination with a platelike spare wheel cover member having an opening arranged to be disposed in front of the spare wheel hub, radially flexible means pivotally connected to the member interiorly thereof and arranged so as to swing out through the opening, and a cap for the opening and formed to be interlocked with said means upon flexure of said means in one direction, whereby the cap may swing to open and closed positions relative to said opening.

9. In combination with a platelike spare wheel cover member having an opening arranged to be disposed in front of the spare wheel hub, a cap for the opening, an expansible and contractible split ring connected to the member and engaging said cap after said ring has been flexed, and means for holding the ring and cap interengaged.

10. In combination with a platelike spare wheel cover member having an opening arranged to be disposed in front of the spare wheel hub, a cap for the opening, means connected to the member and being flexible to detachably engage said cap, and means for holding the first means and cap together, said first means being formed to telescopically engage the hub coaxially therewith to support the member and cap centrally from the hub.

11. In combination with a platelike spare wheel cover member having an opening arranged to be disposed in front of the spare wheel hub, a cap formed to be applicable interchangeably to the hub and said opening, and means affording a detachable and pivotal connection between said member and cap to enable the cap to be swung to open and closed positions while connected to said means.

12. In combination with a platelike spare wheel cover member having an opening arranged to be disposed in front of the spare wheel hub, a cap for the opening, an expansible and contractible split ring connected to the member and engaging said cap after said ring has been flexed, and means for holding the ring and cap interengaged, said cap having means for detachably connecting the same to the hub whereby the cap is interchangeably mountable on the hub and member.

13. In combination with a plate-like spare wheel cover member having an opening arranged to be disposed in front of the spare wheel hub, a cap for the opening, an expansible and contractible split ring having a peripheral recess for receiving the cap when the ring is flexed so as to interlock the ring and cap, means for holding the ring and cap interlocked, means affording a pivotal connection between the ring and member to enable the cap to be swung to open and closed positions while connected to the ring, and latch means associated with the cap and member for releasably retaining the cap in closed relation to the member.

14. In combination with a plate-like spare wheel cover member having an opening arranged to be disposed in front of the spare wheel hub, a cap having means adapted to cooperate with the hub for detachably connecting the cap to the hub, a part pivotally mounted on the member and arranged to swing through said opening, said part and means being constructed and arranged to be detachably interlocked so that the cap may swing into closed and open positions relative to said opening.

15. In combination with a plate-like spare wheel cover member having an opening arranged to be disposed in front of a spare wheel hub, a cap for said opening and provided with means adapted to connect the cap to the hub, and a part movably mounted on said member and detachably supporting said cap through said means so that the cap may be shifted to open and closed positions relative to said opening while the cap is supported by the member.

16. In combination with a plate-like spare wheel cover member having an opening arranged to be disposed in front of a spare wheel hub, a cap for said opening and provided with means adapted to connect the cap to the hub, a part movably mounted on the member and constructed and arranged to detachably receive said means whereby to detachably support the cap from the member selectively in hub-revealing and hub-concealing positions, and centering means disposed in substantially centered relation to said member and engageable with the hub when the cap is in hub concealing position, to hold the member in centered relation to the wheel.

17. In combination with a plate-like spare wheel cover member having an opening arranged to be disposed in front of a spare wheel hub, a cap for said opening and provided with means adapted to connect the cap to the hub, a part movably mounted on said member and detachably supporting said cap through said means so that the cap may be shifted to open and closed positions relative to said opening while the cap is supported by the member, and means spaced from the first mentioned means and associated with the cap and member for retaining the cap in closed relation to said opening.

18. In a spare wheel cover construction, a plate-like member having an opening arranged to be disposed in front of the spare wheel hub, a cap having a skirt provided with spaced openings, a spring secured to the skirt and having spaced latch portions slidably passing outwardly through said spaced openings and adapted to cooperate with the hub to detachably secure the cap thereto, a part mounted on the member and insertable between said portions and skirt when said portions are sprung inwardly and having openings registrable with the skirt openings and into which said portions may project when released, whereby to detachably support the cap from the member.

19. In a spare wheel cover construction, a plate-like spare wheel cover member having an opening arranged to be disposed in front of the spare wheel, a cap member for the opening and having a skirt and connected to the cover member, said cover member having a movable mounting for embracing the skirt on the cap member and radially flexible means movably mounted on one of said members and interlockable upon flexure thereof with the other member through said skirt, thereby connecting said members together so that said cap member may move to open and closed positions relative to said opening while connected to the cover member.

ARTHUR P. FERGUESON.